Patented May 13, 1941

2,241,706

UNITED STATES PATENT OFFICE 2,241,706

GRANULAR ARTICLE CONTAINING CELLULOSE ETHER AND WAX

Earle L. Kropscott, Midland, Mich., assignor to The Dow Chemical Company, Midland, Mich., a corporation of Michigan No Drawing. Application June 6, 1939, Serial No. 277,678

4 Claims. (Cl. 106—40)

This invention relates to a granular article consisting of a lower alkyl ether of cellulose and a wax, and to a method whereby the said article having certain desired characteristics may be produced.

It is among the objects of the invention to provide a free-flowing article consisting of a uniform mixture of a wax and a cellulose lower alkyl ether which will mix easily with resins and plasticizers to form homogeneous light-colored melts.

A further object is to make a granular article of uniform composition consisting of a cellulose ether and a wax.

These objects are attained according to the invention by mixing an aqueous dispersion of molten wax with finely divided water-wet cellulose lower alkyl ether. Examples of methods of carrying out this process are:

EXAMPLE 1

Solid wax is added to hot water (at a temperature, for example, of between 90° and 95° C.) and, when it is melted, it is dispersed throughout the water by vigorous agitation. An oil-in-water type emulsion of a cellulose lower alkyl ether solution is slowly added to the agitated molten wax dispersion. The solvent contained in the emulsion begins to evaporate on addition to the hot wax dispersion, and to hasten this process the mixture is heated, for example, by blowing steam through it. The cellulose ether precipitates and immediately absorbs wax to form uniform granules. After cooling, these are separated from the water and dried, for example, in an oven or in a shelf dryer.

EXAMPLE 2

Water-wet cellulose lower alkyl ether is suspended in hot water and finely ground wax is slowly added during agitation. The wax melts as it is added to the hot water and in this form is absorbed by the cellulose ether with the formation of a uniform cellulose ether-wax mixture. After the addition of the desired amount of wax, the suspension is cooled to form granules and filtered. Cellulose ether-wax granules are dried as indicated in Example 1.

For this second method of preparation to be successful, the cellulose lower alkyl ether must be thoroughly water-wet as in this state the material is very porous and absorptive. This condition may be attained suitably by pouring into water a solution of a water-insoluble cellulose ether in a water miscible solvent or in a solvent which flash evaporates on contact with hot water. For example, an alcoholic solution of ethyl cellulose may be poured into water and the mixture stirred to precipitate the ethyl cellulose particles in the swelled, absorptive condition. Another way in which the suspension of the cellulose ether may be prepared in preferred form is to stir or beat the cellulose ether in an aqueous medium in the presence of a water miscible solvent and swelling agent for the cellulose ether, such as methanol, ethanol, or acetone in concentration too low to dissolve the ether but high enough to cause swelling. Thus dry ethyl cellulose may be stirred or beaten into a 20 per cent solution of ethanol in water. The method described in Example 1, wherein an emulsion of a cellulose ether solution is poured into hot water-wax suspension, forms a water-wet dispersion of the cellulose ether in which the wax is absorbed.

If the cellulose ether employed in the slurry is not water-wet and absorptive, the cellulose ether wax granules are less uniform than those prepared according to the preferred embodiment of the invention.

The actual size and uniformity of the wax-cellulose ether granules may vary considerably, but this variation may be controlled by controlling the temperature of granule formation and the agitator speed in the mixing vessel. The higher the temperature employed, the smaller are the granules obtained under otherwise similar conditions. Likewise with other conditions constant, the higher the agitator speed, the smaller the granules produced.

The proportion of wax to cellulose ether in my product may be from 2 to 60 per cent of wax for each 98 to 40 per cent of cellulose ether. With these proportions of ingredients, the aforesaid process in either of its described modifications gives a free-flowing granular article.

The method may be used to produce useful granular articles from any wax in combination with a lower alkyl ether of cellulose, thus montan wax, paraffin wax, candelilla wax, hydrogenated castor oil wax, carnauba wax, Chinese insect wax, esparto grass wax, Japan wax, or mixtures of two or more of these substances may be used. The use of hydrogenated castor oil wax in the form of cellulose ether-wax granules is particularly advantageous, since the two components are not soluble in the same volatile solvents, and hence cannot be mixed by forming a common solution of useful concentration.

Of the available organo-soluble cellulose lower alkyl ethers, we prefer to use ethyl cellulose, but we may utilize water-insoluble methyl cellulose, propyl cellulose, butyl cellulose, or mixed ethers, such as methyl ethyl cellulose, ethyl propyl cellulose, and the like. The invention is particularly useful and has particular application in the preparation of a granular article suitable for use in formulating hot-melt coating compositions. These are customarily made by melting together resins, plasticizers, and waxes, and dissolving a cellulose ether in the molten mixture. A high temperature is necessary to get a homogeneous melt and the rate of solution of the cellulose ether in the melt is frequently slow. During solution, partial decomposition of the cellulose ether occurs with concomitant darkening and coloring of the melt. The new granular products have a lower softening point than that of the cellulose ether which they contain. They melt and disperse in plasticizer-resin mixtures at comparatively low temperatures and in a short period of time, thus reducing the amount of discoloration when forming resin-wax-cellulose ether melts.

The following table illustrates a few of the properties of several ethyl cellulose-wax mixtures in granular form prepared according to the invention. The ethyl cellulose employed contains 48.4 per cent ethoxyl and its 5 per cent solution in 80:20 toluene-ethanol has a viscosity of 10 centipoises. A 10 per cent solution in the same solvent has a viscosity of 70 centipoises. The granules were prepared by mixing the required amounts of ethyl cellulose and wax according to the aforesaid process. Uniform granules were formed which were separated from most of the water by centrifuging and dried in a stream of warm air. Viscosity data in the table are expressed in centipoises and are determined in a 10 per cent solution in 80:20 toluene ethanol.

I claim:
1. The method of preparing a uniform granular composition consisting essentially of a cellulose ether and wax, which comprises mixing with agitation a molten wax with an aqueous suspension of a water-wet precipitated cellulose lower alkyl ether at a temperature above the melting point of the wax, cooling to a temperature below the melting point of the wax, and separating the granular particles thereby obtained.
2. The method of preparing a uniform granular composition consisting essentially of ethyl cellulose and wax, which comprises mixing with agitation a molten wax with an aqueous suspension of water-wet precipitated ethyl cellulose at a temperature above the melting point of the wax, cooling to a temperature below the melting point of the wax, and separating the granular particles thereby obtained.
3. The method of preparing a uniform granular composition consisting essentially of ethyl cellulose and hydrogenated castor oil wax which comprises mixing with agitation a molten hydrogenated castor oil wax with an aqueous suspension of water-wet precipitated ethyl cellulose at a temperature above the melting point of the wax, cooling to a temperature below the melting point of the wax and separating the granular particles thereby obtained.
4. The method of preparing a uniform granular composition consisting essentially of ethyl cellulose and paraffin wax which comprises mixing with agitation a molten paraffin wax with an aqueous suspension of water-wet precipitated ethyl cellulose at a temperature above the melting point of the wax, cooling to a temperature below the melting point of the wax and separating the granular particles thereby obtained.

TABLE I

*Properties of granular ethyl cellulose compositions comprising wax*

| No. | Composition | | | Ethoxy content of composition | | Softening point | Viscosity |
|---|---|---|---|---|---|---|---|
| | Ethyl cellulose | Wax | | Experimental | Theoretical | | |
| | | Name | Amount | | | | |
| | Per cent | | Per cent | | | °C. | |
| 1 | 98 | Hydrogenated castor oil | 2 | 47.7 | 47.5 | 165 | 59.6 |
| 2 | 95 | ...do... | 5 | 46.1 | 46.0 | 159–161 | 57.9 |
| 3 | 90 | ...do... | 10 | 43.7 | 44.0 | 155 | 49.1 |
| 4 | 85 | ...do... | 15 | 41.2 | 41.8 | 145–148 | 45.0 |
| 5 | 70 | ...do... | 30 | 33.8 | 33.8 | 122–130 | |
| 6 | 50 | ...do... | 50 | 24.9 | 24.2 | 102–105 | |
| 7 | 40 | ...do... | 60 | 21.2 | 19.6 | 88–90 | |
| 8 | 90 | Carnauba wax | 10 | 44.2 | 44.0 | 158–160 | |
| 9 | 50 | ...do... | 50 | 24.6 | 24.2 | 120–122 | |
| 10 | 90 | Montan wax | 10 | 44.5 | 44.0 | 148–150 | |
| 11 | 50 | ...do... | 50 | 26.1 | 24.2 | 90–93 | |
| 12 | 90 | Esparto grass wax | 10 | 43.6 | 44.0 | 150–153 | |
| 13 | 50 | ...do... | 50 | 24.0 | 24.2 | 100–105 | |
| 14 | 90 | Paraffin wax | 10 | 43.8 | 44.0 | 158–159 | |
| 15 | 60 | ...do... | 40 | 28.1 | 28.4 | 125–127 | |
| 16 | 100 | None | 0 | 48.4 | | 165–170 | 70 |

It is seen that the experimental and theoretical values for ethoxyl content in the granules agree closely and hence that each batch of granules is quite uniform in composition.

EARLE L. KROPSCOTT.